United States Patent
Tipping

[11] 3,752,010
[45] Aug. 14, 1973

[54] COAXIAL HYDROMECHANICAL TRANSMISSION

[75] Inventor: Roderick G. Tipping, Indianapolis, Ind.

[73] Assignee: General Motors Corporation, Detroit, Mich.

[22] Filed: Nov. 22, 1971

[21] Appl. No.: 200,808

[52] U.S. Cl. .................................. 74/687, 74/785
[51] Int. Cl. ...................... F16h 47/04, F16h 57/10
[58] Field of Search ............................. 74/687, 785

[56] References Cited
UNITED STATES PATENTS

| | | | |
|---|---|---|---|
| 3,283,612 | 11/1966 | Densham | 74/687 |
| 3,405,573 | 10/1968 | Takekawa | 74/687 |
| 3,489,035 | 1/1970 | Giles | 74/687 |
| 3,489,036 | 1/1970 | Cockrell et al. | 74/687 |

*Primary Examiner*—Arthur T. McKeon
*Attorney*—W. E. Finken, D. F. Scherer et al.

[57] ABSTRACT

A synchronous shifting variable ratio hydromechanical transmission including a variable ratio hydraulic transmission, a multi-ratio planetary gearing arrangement, and a housing with a support member positioned therein. The variable ratio hydraulic transmission has a pump and a motor rotatably mounted and axially aligned on opposite sides of the support member. An input shaft drivingly connected to the pump, is rotatably supported in the housing. An output shaft axially aligned with the input shaft is rotatably journaled in the housing and is drivingly connected with the planetary gearing arrangement. An intermediate shaft axially aligned with the input shaft extends through the support member to cooperate with a selectively operable friction clutch to establish a mechanical drive to the planetary gearing of the transmission from the input shaft thereby providing a high range split hydromechanical drive. A selectively operable friction brake disposed in the housing cooperates with the gearing to provide a low range hydrostatic drive with a mechanical gear reduction. The transmission permits synchronous shifting between the low and high ranges.

4 Claims, 3 Drawing Figures

INVENTOR.
Roderick G. Tipping
BY
Donald F. Scherer
ATTORNEY

Patented Aug. 14, 1973

INVENTOR.
Roderick G. Tipping
BY
Donald H. Scherer

ATTORNEY

INVENTOR.
Roderick G. Tipping
BY
Donald F. Scherer
ATTORNEY

COAXIAL HYDROMECHANICAL TRANSMISSION

This invention relates to hydromechanical transmissions and more particularly to coaxial synchronous shifting hydromechanical transmissions.

Prior art hydromechanical transmissions with synchronous shifting capabilities have generally employed a counter shaft to provide a drive connection between the input shaft of the transmission and the mechanical gearing portion of the transmission. While these arrangements are quite satisfactory they do require a large transmission housing to facilitate the use of the counter shaft. Non-synchronous shifting hydromechanical transmissions have been proposed and do provide coaxial arrangement between the hydraulic portion of the mechanical gearing portion of the transmission. However, these types of transmissions require large displacement changes in the hydraulic portion of the transmission during a change in the transmission from one range to another. This does pose control problems and quite often undesirable long shift times during a range change.

The present invention provides a transmission in which the hydraulic portion and the mechanical gearing portion are coaxially aligned and the mechanical drive from the input to the planetary gearing is also coaxially aligned. Also, the present invention permits synchronous shifting between drive ranges of the transmission.

The transmission has at the input end a radial variable displacement pump and motor rotatably mounted on a common hollow pintle portion of a support member which has a central annular wall portion mounted in the transmission housing and at the output end two compounded sun, ring and planet pinion gear sets with the front ring gear having a brake and the rear ring gear connected to an output shaft with all these units and connecting shafts coaxial to provide a transmission housing envelope of minimal length and diameter. When an engine drop box or spaced parallel engine input shaft and reduction gearing type drive is used, the mechanical input clutch is radially within the input gearing and connects the input shaft to drive the front end of a mechanical input shaft extending through the hollow pintle to reduce the axial length of the transmission. When a coaxial engine input shaft is used the input clutch connects the rear end of the mechanical input shaft to the gearing and is placed at the output side of the gearing so the transmission housing envelope diameter is reduced toward the output end.

It is therefore an object of this invention to provide an improved synchronous shifting hydromechanical transmission in which the hydraulic portion, the mechanical gearing portion and the mechanical input drive to the gearing are coaxially aligned.

It is another object of this invention to provide an improved coaxial synchronous shifting hydromechanical transmission in which the pump and motor are coaxially aligned on opposite sides of a support member and the mechanical input shaft is coaxially journaled in said support member to provide a compact transmission having a minimal length and diameter envelope.

These and other objects and advantages of the invention will be more apparent from the following description and drawings in which.

Figure 1:
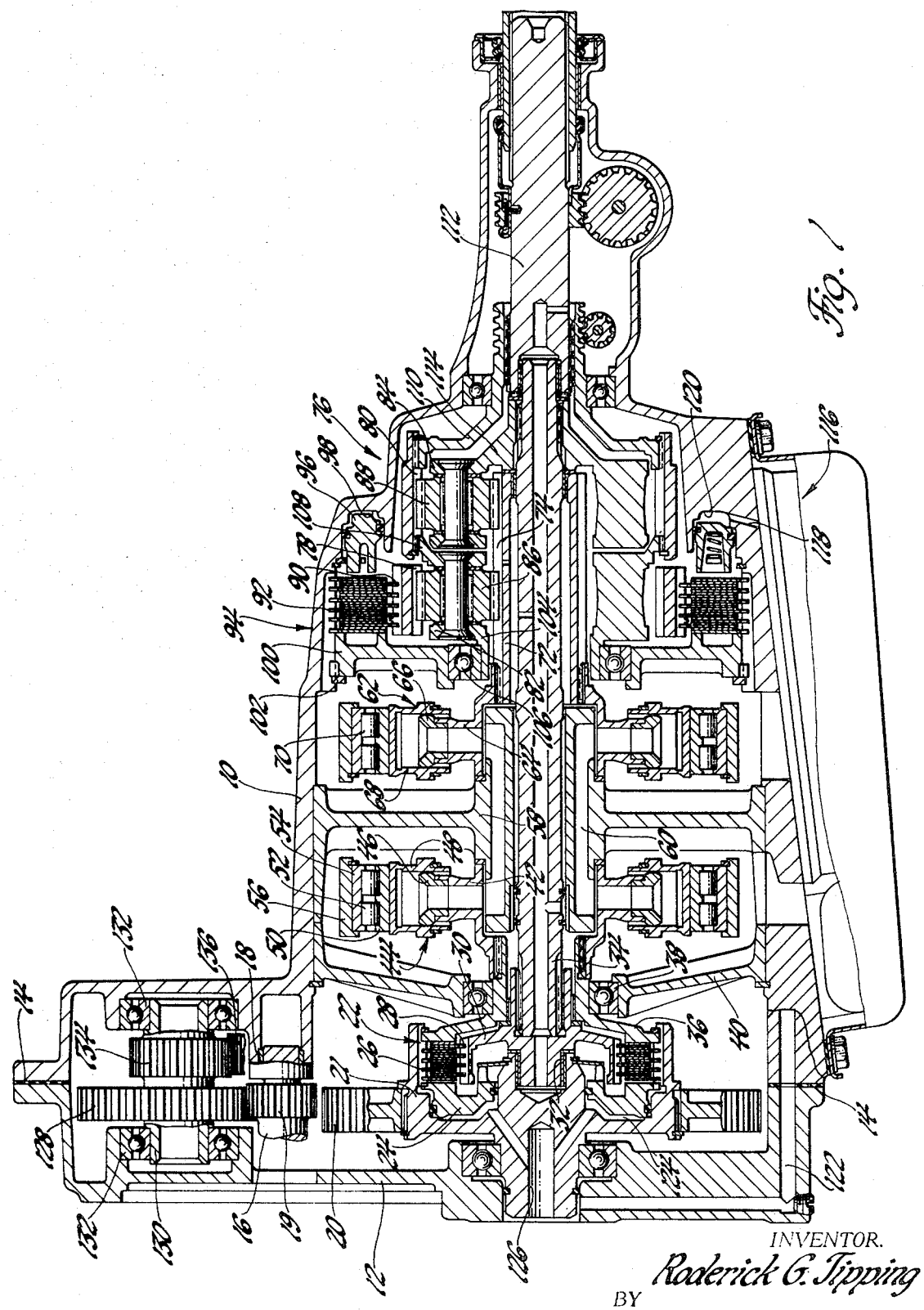
FIG. 1 is a cross-sectional elevational view of one embodiment of the transmission.
Figure 2:
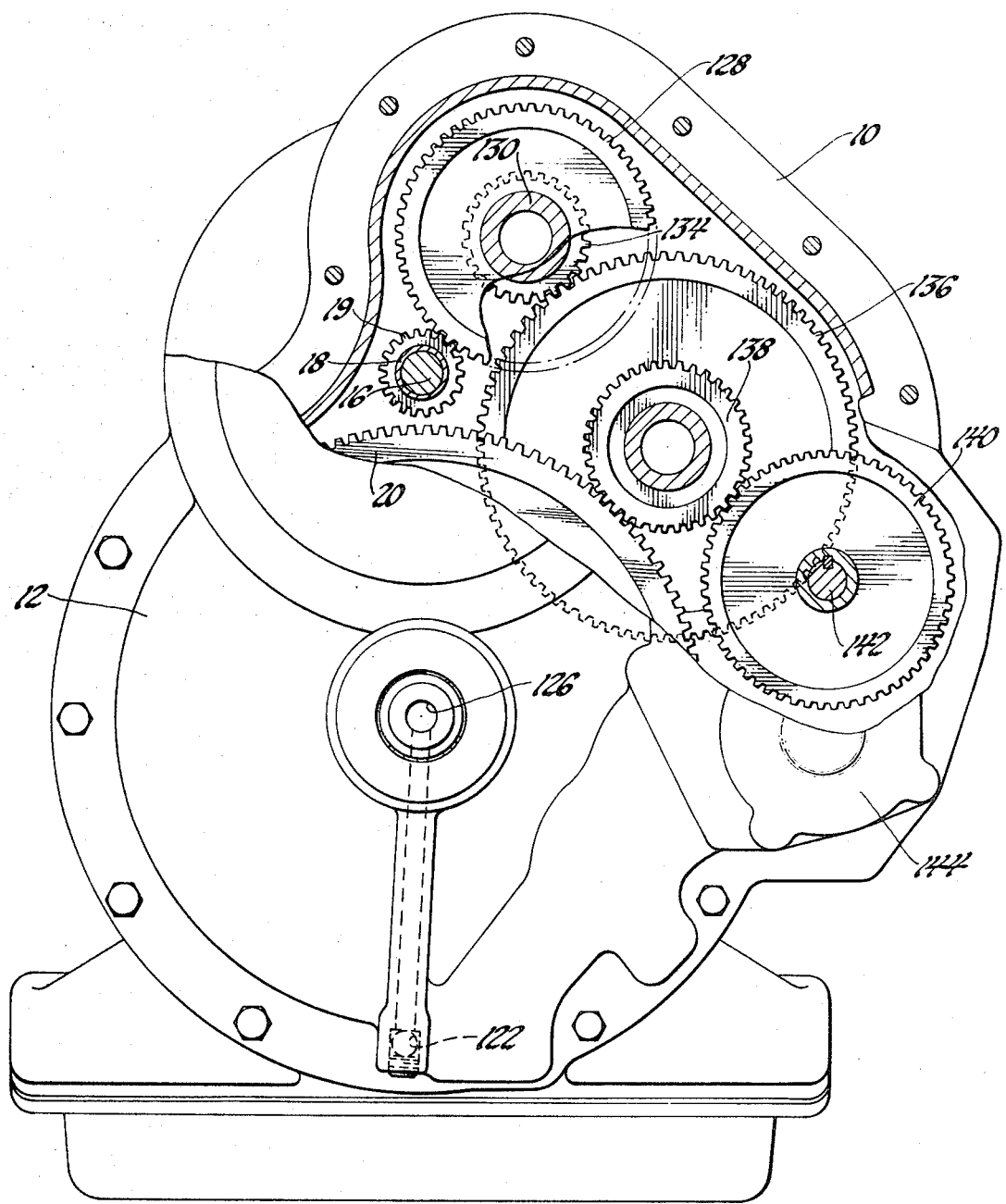
FIG. 2 is an end view, partly in cross-section, of FIG. 1.

Referring to the drawings wherein like characters represent the same or corresponding parts there is shown in FIGS. 1 and 2 a hydromechanical transmission having a stationary housing 10 and an end cover 12 secured to the housing 10 and separated therefrom by a gasket or seal 14. A power input shaft 16 is rotatably supported in the housing 10 by a bushing 18. The input shaft 16 has a gear 19 machined thereon which drives a gear 20 secured on a hub 21 through a plurality of spur gears 128, 134, 136 and 138. The hub 21 forms a part of a high range clutch, generally designated, 22 which clutch includes an apply piston 24 slidably disposed in the hub 21, a plurality of alternately spaced friction plates 26 and 28 splined to the hub 21 and a second hub 30 respectively. The hub 30 is journaled in a bushing 32, which is secured in the hub 21, and is also splined to an intermediate shaft 34. A drive hub 36 is splined to the hub 21 and is rotatably supported by a ball bearing 38 and a web 40 in the transmission housing 10. The drive hub 36 is splined to a rotor 42 of a hydraulic pump generally designated 44.

The input shaft 16 is adapted to be driven by a gas turbine engine, not shown. The gear train 19, 128, 134, 136, 138 and 20 provide a speed reduction between the engine and the hub 21 so that the high range clutch 22 and the hydraulic pump 44 rotate at a lesser speed than the engine. This gearing arrangement permits the use of spaced parallel engine input shaft and transmission drive members without increasing the axial length of the engine and transmission combination.

The pump 44 is a radial type piston pump similar to that disclosed in the U.S. Pat. to Simmons No. 3,274,946, and includes a plurality of pistons 46 secured to the rotor 42 and slidably disposed in a plurality of cylinders 48 which are slidably mounted on the inner race 50 of a roller bearing 52. The outer race 54 of the roller bearing 52 is secured in a ring 56. The ring and roller bearing 56 and 52 are movable to provide variable displacement for the pump 44. The method and apparatus for controlling the movement of the ring 56 can be any of the well-known servocontrol systems presently available and, if desired, the structure shown in the above Simmons patent can be used to control the pump displacement.

The rotor 42 is rotatably supported on a support member 58 which is positioned in the housing 10. The support member 58 has a plurality of fluid passages 60 which communicate fluid from the pump 42 to a motor generally designated 62 which is similar in design to the pump 44 and includes a rotor 64 having a plurality of pistons 66 secured thereto and slidably disposed in a plurality of cylinders 68 which slidably abut the inner race of a roller bearing 70. The rotor is rotatably mounted on the support member 58.

The rotor 64 of the motor 62 is splined to a sleeve shaft 72 on which is formed a pair of sun gears 74. The sun gears 74 are journaled on the intermediate shaft 34 and form a part of a planetary gearing generally designated 76. The planetary gearing includes a pair of ring gears 78 and 80, a pair of planet carriers 82 and 84 on which are rotatably mounted a plurality of pinion gears 86 and 88 respectively. The pinion gears 86 mesh with the sun gear 74 and a ring gear 78 and the pinion gears 88 mesh with the sun gear 74 and the ring gear 80. The ring gear 78 is drivingly connected to a plurality of friction plates 90 which are alternately spaced with a plurality of friction plates 92 that are splined to the housing 10. The friction plates 90 and 92 cooperate to form a portion of a low brake, generally designated, 94 which includes an annular piston 96 slidably disposed in an annular recess 98 formed in the housing 10 and a back up and support member 100 which is splined to the housing 10 and positioned therein by a snap ring 102.

The carrier 82 has a hub 104 rotatably mounted on the back up and support member 100 by a ball bearing 106 and a second hub member 108 splined to the ring gear 80. The ring gear 80 and the carrier 82 are drivingly connected through a hub 110 to an output shaft 112 which provides a power output from the transmission. The carrier 84 has a hub 114 which is splined to the intermediate shaft 34.

The low brake 94 is pressure operated and controlled by a conventional control apparatus, generally designated, 116. Fluid pressure is supplied from the control 116 through a passage 118 which is in fluid communication with a chamber 120 formed between the piston 96 and the annular recess 98. When fluid pressure is supplied to the passage 118 the piston 96 is moved into abutment with the friction discs 90 and 92 to apply the brake 94 so that rotation of the ring 78 is prevented.

The high range clutch 22 is also controlled by the control apparatus 116 which selectively supplies pressure to the clutch 22 through a passage 122 formed in the housing 10 and the end cover 12. The passage 122 is in fluid communication with a chamber 124 formed between the piston 24 and the hub 21 via a passage 126 in the hub 21.

A gear 128, formed on a shaft 130 which is supported in the housing 10 and cover 12 by ball bearings 132, meshes with the gear 19. Also formed on the shaft 130 is a second gear 134 which meshes with an idler gear 136 to which is secured another idler gear 138. The idler gear 138 meshes with a pump drive gear 140 which is drive connected to a pump input shaft 142 which drives a conventional gear type control pump 144. The control pump 144 provides fluid under pressure to control the transmission clutches and brakes. The gearing arrangement used to drive the pump 144 permits design flexibility so the pump 144 may be located in a desirable position and also permits the pump input to be rotated at a speed other than transmission input speed.

When the transmission is in neutral the pump 44 will be set at zero displacement, the motor 62 will be set at maximum displacement, the low brake 94 and the high clutch 22 will both be disengaged. As the input shaft rotates the pump 44 will be driven, however, no fluid will be delivered to the motor 62 since the pump displacement is zero. To condition the transmission for low range operation the low brake 94 is engaged and the pump 44 is moved off center to provide fluid flow to the motor 62. The motor 62 will drive the sun gear 74 which in turn will drive the carrier 82, since the ring gear 78 is stationary, to provide a drive to the output shaft 112. As the displacement of the pump 44 is increased to a maximum, the motor speed and therefore the output shaft speed will increase. The carrier 84 is also driven during the low range operation by the sun gear 74 and the ring gear 80. When the pump 44 reaches maximum displacement the carrier 84 and the intermediate shaft 34 will be rotating at a speed equal to the speed of the power input shaft 16. At this time the high range clutch 22 may be engaged with no speed differential between the friction discs 26 and 28. Simultaneously with the engagement of clutch 22 the brake 94 is disengaged so that a hydraulic power component from the motor 62 and a mechanical power component through the intermediate shaft 34 are imposed on the planetary gearing 76. To provide a further increase in speed of the output shaft 112 the pump displacement 44 is decreased from maximum toward zero. As the displacement of the pump 44 is decreased, the speed of the motor 62 will decrease thereby causing a decrease in the speed of sun gear 74. Thus, the sun gear 74 becomes a rotating reaction member in the gearing. However, the carrier 84 is being driven directly by the input shaft 16 at this time so that the ring gear 80 will increase in speed as the sun gear 74 decreases in speed. When the pump 44 reaches zero displacement, the motor 62 will be stationary thereby causing the sun gear 74 to remain stationary to provide a stationary reaction member in the planetary gearing 76. At this time the drive from input shaft 16 to the output shaft 112 is purely mechanical. The speed of the output shaft 112 may be further increased by moving the pump 44 to the opposite side of center which will cause the motor 62 to rotate in a direction opposite to the previously described speed ranges thus adding to the speed component of the carrier 84 to provide an increase in the speed of ring gear 80.

To provide a reverse drive the low brake 94 is engaged and the pump 44 is displaced in the opposite side of center from the low forward range operation. This causes the motor 62 to rotate in reverse direction which drives the sun gear 74 in the reverse direction and therefore the carrier 82 and the output shaft 112 are driven in reverse.

Figure 3:
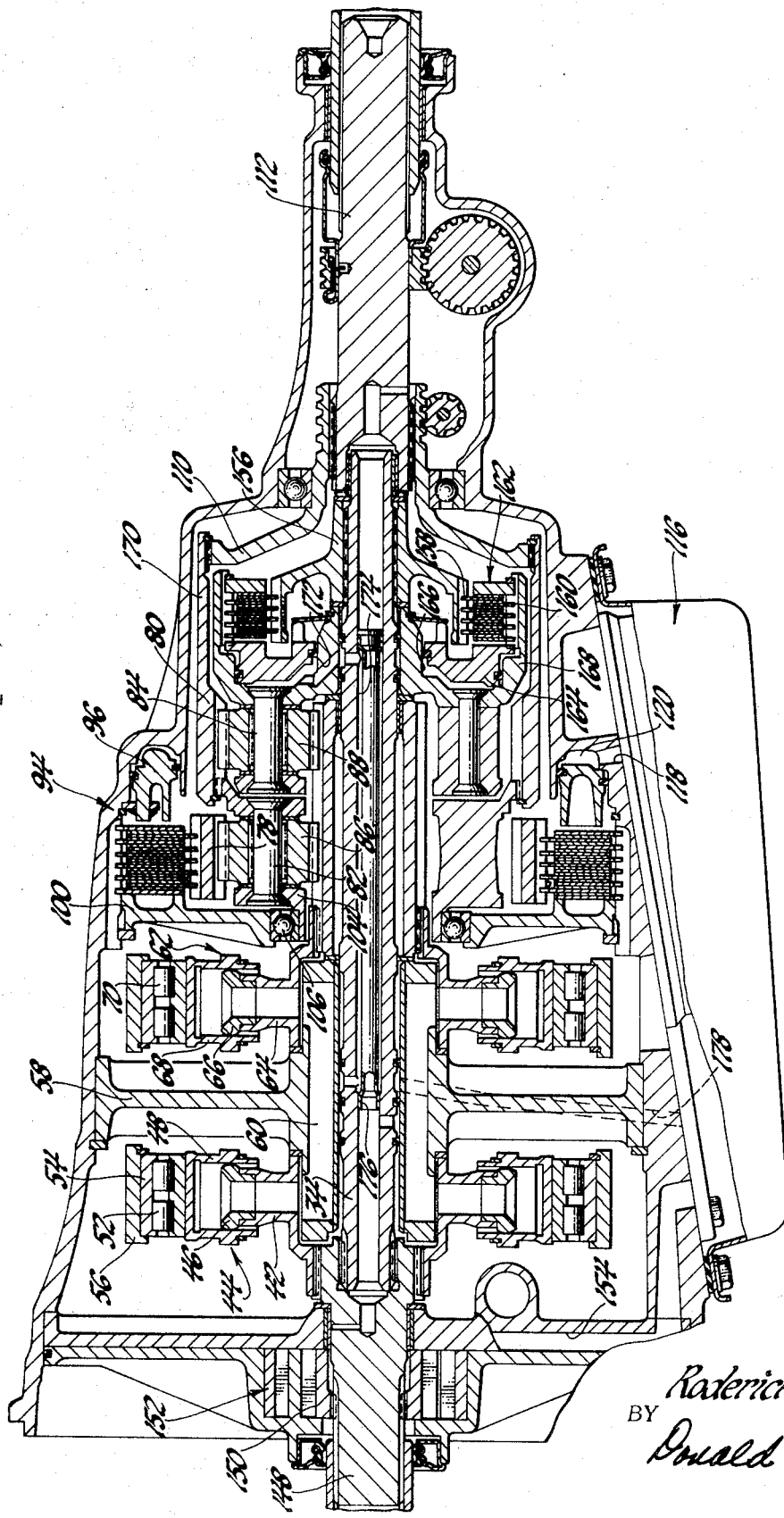
FIG. 3 is a cross-sectional elevational view of another embodiment of the invention.

The transmission shown in FIG. 3 is similar in construction to the transmission shown in FIG. 1 so that corresponding parts have been given the same numerical designation and will not be reexplained with any detail. An input shaft 148 is splined to an internal gear 150 of an internal-external type gear pump generally designated 152. The gear pump 152 provides fluid pressure through a passage 154 to the control apparatus 116. The input shaft 148 is splined to the rotor 42 of the pump 44 and also to the intermediate shaft 34. In this arrangement the engine shaft is coaxial with the input shaft 148.

The intermediate shaft 34 is splined to a hub 156 near the rear of the transmission which hub is drivingly connected to a plurality of friction plates 158 which cooperate with a plurality of friction plates 160 to form a part of a high clutch, generally designated, 162. The high clutch 162 includes a piston 164 slidably disposed in an annular recess 166 formed in a hub 168 which forms a portion of the carrier 84. The hub 168 is also splined to the friction discs 160. A ring gear 80 has an annular extension 170 which is splined to the hub 110 secured through a spline to the output shaft 112. The high range clutch 162 is operated by fluid pressure which is directed through a passage 172 formed in the carrier 84. The passage 172 is in fluid communication with a passage 174 which is formed in the center portion of the intermediate shaft 34 by a tube 176. The passage 174 is in fluid communication with the control apparatus 116 through a passage 178 disposed in the transmission housing and the support member 54.

The operation of the transmission shown in FIG. 3 is identical to the operation of the transmission shown in FIG. 1 and it is not believed necessary to repeat a description of the operation at this time. The main structural differences between the transmission shown in FIG. 1 and FIG. 3 are in the location of the high clutch and the input drive to the transmission. As is readily seen in the drawings, the high clutch 22, in FIG. 1, is located forward or on the input shaft side of the intermediate shaft 34 while the high clutch 162, in FIG. 2, is located rearward or on the output shaft side of the output shaft end of the intermediate shaft 34. The remaining structure of the transmissions is quite similar.

Obviously, many modifications and variations of the present invention are possible in light of the above teachings. It is, therefore, to be understood that within the scope of the appended claims the invention may be practiced otherwise than as specifically described.

What is claimed is:

1. A hydromechanical transmission comprising in combination; variable displacement hydraulic transmission means including a housing having a support portion with a central bore; a variable displacement hydraulic pump device rotatably mounted on one side of said support portion and having a central bore, a hydraulic motor device rotatably mounted on the other side of said support portion in fluid communication with said hydraulic pump device through said support portion and having a central bore; an input shaft drivingly connected with said hydraulic pump device, an intermediate shaft extending coaxially through said central bores of said hydraulic pump device, said support portion and said hydraulic motor device; an output shaft axially aligned with said input shaft and said intermediate shaft; planetary gearing means coaxial with said intermediate shaft and on said other side of said support portion including six members with a sleeve shaft consisting of the first and second members drivingly connected with said hydraulic motor device, and third and fourth members drivingly connected with said output shaft; first clutch means coaxial with said intermediate shaft and selectively operable to connect the fifth member of said gearing means with said input shaft through said intermediate shaft; and brake means selectively operable to connect the sixth member to said housing.

2. A hydromechanical transmission comprising in combination; variable displacement hydraulic transmission means including a housing having a support portion with a central bore; a variable displacement hydraulic pump device rotatably mounted on one side of said support portion and having a central bore, a hydraulic motor device rotatably mounted on the other side of said support portion in fluid communication with said hydraulic pump device through said support portion and having a central bore; an input shaft drivingly connected with said hydraulic pump device, an intermediate shaft extending coaxially through said central bores of said hydraulic pump device, said support portion and said hydraulic motor device; an output shaft axially aligned with said input shaft and said intermediate shaft; planetary gearing means coaxial with said intermediate shaft and on said other side of said support portion including a sleeve shaft consisting of first and second sun gears, first and second ring gears and first and second planet carrier means with said first and second sun gears drivingly connected by said sleeve shaft with said hydraulic motor device, and said first planet carrier means and said second ring gear drivingly connected with said output shaft; first clutch means coaxial with said intermediate shaft and selectively operable to connect the second planet carrier means with said input shaft through said intermediate shaft; and brake means selectively operable to connect the first ring gear to said housing.

3. A hydromechanical transmission comprising in combination; a housing; a support member secured in said housing and having a central bore; a variable ratio hydraulic transmission including a variable displacement hydraulic pump and a hydraulic motor coaxially rotatably mounted on opposite sides of said support member; an input shaft rotatably mounted in said housing coaxial with and drivingly connected with said variable displacement hydraulic pump; an output shaft aligned with said input shaft; planetary gearing means having a sleeve shaft consisting of a pair of sun gears drivingly connected with said hydraulic motor, a first carrier and first ring gear drivingly connected with said output shaft, a second carrier and a second ring gear; selectively operable brake means operatively connected between said housing and said second ring gear to establish a gear drive in series with said hydraulic transmission between said input and output shafts; an intermediate shaft coaxially aligned with said input shaft; and extending through said central bore of said support member; and selectively operable clutch means for providing a drive connection including said intermediate shaft between said input shaft and said second carrier to establish a mechanical drive to said planetary gearing in parallel with said hydraulic transmission; said hydraulic transmission and said planetary gearing cooperating to provide synchronous interchange of said brake means and said clutch means.

4. A hydromechanical transmission comprising in combination; a housing; a variable ratio hydraulic transmission including a support member secured in said housing and having an annular wall centrally connected to a pintle member extending forwardly to provide a pump pintle portion and rearwardly to provide a motor pintle portion and having a plurality of axial passages connecting said pump and motor pintle portions and a central axial bore within said passages, a variable displacement radial hydraulic pump and a hydraulic motor coaxially rotatably mounted on opposite sides of said support member each having a rotor having a cylindrical portion in bearing engagement respectively with said pump and motor pintle portions; an input shaft rotatably mounted in said housing coaxial with and drivingly connected with said cylindrical portion of said pump; an output shaft aligned with said input shaft; an intermediate shaft coaxially aligned with and rotatably supported on said input and output shafts extending through said central bore of said pintle member and having a drive connection at the forward end to said input shaft; planetary gearing means having a first gear set adjacent said motor and a second gear set adjacent said output shaft and each having a sun gear, a ring gear and a carrier rotatably supporting pinions meshing with said sun and ring gears, said sun gears being a single sleeve member rotatably supported on said intermediate shaft and drivingly connected with said cylindrical portion of said hydraulic motor, said first gear set carrier and second gear set ring gear being drivingly connected with said output shaft, and said second gear set carrier having a drive connection with said intermediate shaft; selectively operable brake means operatively connected and located between said housing and said first gear set ring gear to establish a gear drive in series with said hydraulic transmission between said input and output shafts having a back-up and support member rotatably supporting said front gear set carrier; and one of said intermediate shaft drive connections being selectively operable clutch means for selectively providing a drive connection including said intermediate shaft between said input shaft and said second gear set carrier to establish a mechanical drive to said planetary gearing in parallel with said hydraulic transmission; said hydraulic transmission and said planetary gearing cooperating to provide synchronous interchange of said brake means and said clutch means.

* * * * *